Figure 1:
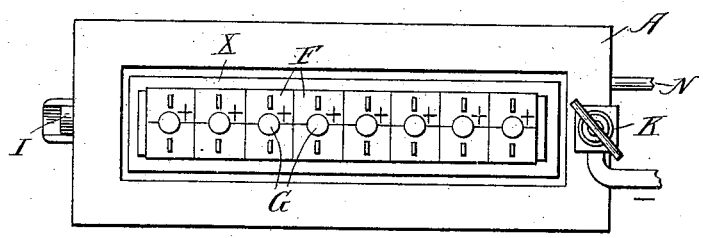

No. 881,049. PATENTED MAR. 3, 1908.
H. S. BLACKMORE.
ART OF LIBERATING ALUMINIUM AND OTHER METALS.
APPLICATION FILED OCT. 29, 1904.

Witnesses
H. N. Jenkins
C. C. Wright

Inventor
Henry James Blackmore

UNITED STATES PATENT OFFICE.

HENRY SPENCER BLACKMORE, OF MOUNT VERNON, NEW YORK.

ART OF LIBERATING ALUMINIUM AND OTHER METALS.

No. 881,049.   Specification of Letters Patent.   Patented March 3, 1908.

Application filed October 29, 1904. Serial No. 230,549.

*To all whom it may concern:*

Be it known that I, HENRY SPENCER BLACKMORE, a citizen of the United States, residing at Mount Vernon, in the county of Westchester and State of New York, have invented new and useful Improvements in the Art of Liberating Aluminium and other Metals, of which the following is a specification.

The object of my invention is to liberate metal or metals from compounds or compositions by thermo-chemical means and perform electrical dissociation of compounds in such a manner that a saving of electric current is effected, the electrical dissociation facilitated and accomplished economically as compared with methods employed hitherto, and whereby a larger yield of metal is obtained with less applied energy by the co-action of the energy evolved during the dissociation of chemical compounds in co-action with energy preferably supplied by means of an electric current, and consists in employing as electrodes, substances containing the metal desired, and carbon, combined, either as carbid, acetylid or other metal binary carbon compound, in which condition the carbid has a natural affinity for the electro-negative constituents of the compound of metal desired to be reduced, which affinity, when exercised during electrolysis, augments the applied electric current to such a degree that the process may be carried on readily with great saving of applied or electrical energy together with an increased reduction of metal from the compound dissociated by the action of the electric current, effecting an increased yield of metal, the heat evolved during the dissociation of the carbid facilitating the compound reduction of metal desired, while at the same time the metal of the carbid electrode reproduces the compound to be decomposed or replenishes the composition depleted by electrical dissociation and chemical reduction, or is simultaneously liberated in metallic form.

As an illustration of my invention, I will take for example the reduction of aluminium from its oxid while mixed with aluminium fluorid.

I place the mixture of aluminium oxid and fluorid in a carbon-lined reduction pot, such as is usually employed for electric smelting, and pass a current of electricity therethrough, employing as electrode, aluminium carbid, which is readily produced at high temperatures in an electric furnace by previous treatment. As the electricity passes through the mixture of aluminium oxid and fluorid, it assumes a molten condition which fluidity may be increased by the addition of calcium chlorid; when the mass has assumed a molten condition, electrical dissociation commences, the electro-negative constituents oxygen and fluorin being liberated at the anode and aluminium at the cathode which constitutes the interior of the reduction pot or receptacle.

The oxygen and fluorin liberated at the anode immediately combine with the aluminium carbid producing carbonic oxid which escapes as a gas, and aluminium fluorid which replenishes the ingredients with fluorid, so that all that is necessary to continue the operation is to supply new aluminium carbid anodes from time to time as depleted or decomposed.

The energy evolved by the chemical action of the carbid reduces the amount of heat or electrical energy ordinarily required to be supplied to bring about the reduction of the metal-containing substances, thereby economizing the applied energy and rendering the metal-containing substances, from a commercial standpoint, more easily reduced; this evolved energy also assists in the electrolytical dissociation to such a degree that much less applied current is necessary to continue the electrolysis and maintain the fusion of the ingredients.

I can substitute any other metal carbid for the aluminium carbid according to the metal desired to be reduced without departing from the spirit of my invention which consists in employing a metal carbid or its equivalent as electrode, in the reduction of metals from their compounds.

The electrode may consist of a mixture of aluminium or other carbid with carbon or other binder, or may consist wholly of the carbid, the essential feature being that the electrode contains a carbid in some form. Instead of metal oxy-fluorid or its equivalent, I can employ any other oxy-haloid or any other substance containing metal and an electro-negative element or elements, so long as the electro-negative element or elements are capable of combining with the carbid electrode.

Figure 2:
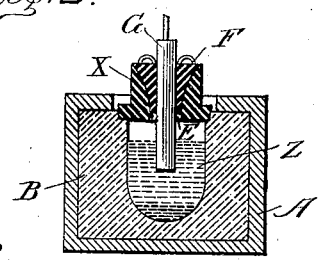
Figure 3:
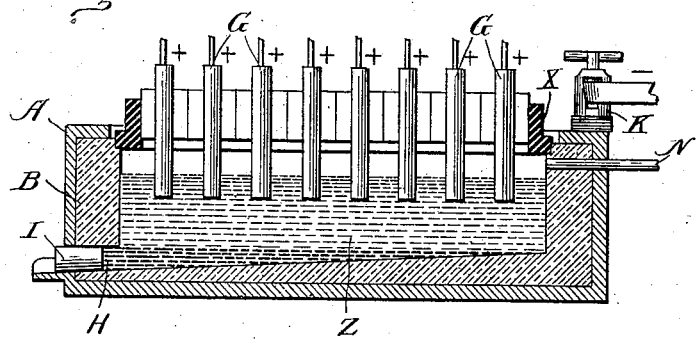

The apparatus which I prefer to employ for carrying out my process in reducing metals is illustrated in the accompanying drawing, in which Figure 1 is a plan or top view; Fig. 2 is a transverse vertical section; and Fig. 3 is a longitudinal vertical section.

Referring to the drawing, the letter A designates a box or receptacle, preferably of cast iron, lined with a conductive substance B, such as carbon.

The material to be reduced is introduced in the apparatus through the openings E which are closed by the insulating covers or plugs F passing into the insulating cover X, through which passes the electrode G which consists of or contains a carbid and is adapted to be employed as anode during the process of electrochemical reduction.

In the operation of the process I prefer to place in the receptacle Z a quantity of calcium chlorid and fuse the same by passing a current of electricity therethrough between the carbon lining of the receptacle B and the electrode G, having first started an electric arc between the same by placing them in contact and gradually separating them, until the calcium chlorid fuses. I then add from time to time quantities of calcium chlorid until the interior of the apparatus has been sufficiently filled; I then add to the molten content a mixture of aluminium fluorid and aluminium oxid, whereupon a reducing action is set up between the electrode G, such as aluminium carbid, and the electro-negative constituents, fluorin and oxygen of the aluminium fluorid and oxid to be reduced, at the same time separating the metallic aluminium from both the aluminium oxid and aluminium fluorid, which accumulates in the bottom of the apparatus and is withdrawn from time to time through the tap-hole H by removing the tap-hole plug I, producing carbonic oxid gas and regenerating aluminium fluorid by combination of the fluorin with the aluminium content of the anode thus replenishing the ingredients with metal fluorid which has been dissociated with the simultaneous deposition of metal, thereby maintaining the fluorid content in uniform and constant condition.

The carbon oxid during the reduction by combination of the carbon of the anode G with oxygen of the substances reduced, escapes as a gas through the conduit N. By supplying new anodes G and fresh aluminium oxid from time to time, and withdrawing the metal reduced, the process may be carried on continuously so long as the materials are maintained in a molten condition, and if the substances are maintained in a molten condition by means supplied external of the electrode G by passing an alternating electric current therethrough, or otherwise, an electric circuit may be established and the current generated during the reduction of the metal and dissolution of the carbid anode G by connecting the apparatus B through the binding post K with the electrode G, may be utilized in any convenient manner.

The particular species of carbid, such as aluminium carbid ($Al^{III}_4 C^{IV}_3$), employed in my process, consists of that class of carbon and metal compounds in which the carbon exists as tetrad and yields methane upon decomposition with water, which class of carbids are specifically termed "methids", such as the aluminium carbid $Al^{III}_4 C^{IV}_3$ (aluminium methid) broadly covered as reducing against my U. S. Patent No. 675,190, dated May 28th, 1901.

It should be noted in connection with the foregoing, that metallic carbids during their formation, absorb large quantities of heat energy, which energy is evolved upon decomposition. These compounds are generally termed endothermic compounds for this reason.

Alloys of aluminium and other metals may be produced by employing compounds of the metal, the alloy of which is desired, in place of aluminium compounds, so long as the electro negative constituent of the metal, an alloy of which is desired, has sufficient affinity for the carbid anode to displace the same, whereby the two metals may be liberated by the concurrent combination of their electro-negative constituents with the carbid, readily uniting to produce alloys thereof.

Having now described my invention, what I claim as new and desire to secure by Letters Patent is:—

1. The process of reducing metal which consists in exposing a substance containing a metal and oxygen, to electrolysis, while employing an electrode containing aluminium methid ($Al_4C_3$).

2. The process of reducing metal which consists in inducing a reaction between an aluminium methid ($Al_4C_3$) electrode and aluminium oxid and fluorid, by passing an electric current through the aluminium methid electrode in communication with the aluminium oxid and fluorid, whereby the metal content of the aluminium oxid and fluorid is reduced by the concurrent combination of their electro-negative constituents with the anode.

3. The process of reducing metal which consists in inducing a reaction between an aluminium methid ($Al_4C_3$) electrode and metal oxid and fluorid, by passing an electric current through the aluminium methid electrode in communication with the metal oxid and fluorid, whereby the metal content of the aluminium carbid and oxid is reduced by the concurrent combination of their electro-negative constituents.

4. The process of reducing metal which consists in exposing a substance containing the same to the combined action of an anode of aluminium methid ($Al_4C_3$) and an electric current.

5. The process of reducing metal which consists in exposing a compound containing metal and one or more electro-negative elements, to the combined action of an anode of aluminium methid ($Al_4C_3$) and an electric current.

6. The process of reducing aluminium which consists in exposing a substance containing aluminium to the combined action of an anode of aluminium methid ($Al_4C_3$) and an electric current.

7. The process of reducing aluminium which consists in exposing a substance containing aluminium to the action of an electrode containing aluminium methid ($Al_4C_3$), while passing an electric current therethrough.

8. The process of reducing aluminium which consists in exposing a substance containing aluminium and oxygen to the action of an electric current, while employing an electrode containing aluminium methid ($Al_4C_3$).

9. The process of reducing aluminium which consists in exposing aluminium oxid to the combined action of an anode of aluminium methid ($Al_4C_3$) and an electric current.

10. The process of reducing metal, which consists in exposing a substance containing the metal to electrolysis, while employing an electrode, containing a methid, decomposable by an ingredient of the substance employed and capable of liberating metal therefrom.

11. The process of reducing metal, which consists in exposing a compound containing the metal, to electrolysis, while employing an electrode containing a metal methid, decomposable by an ingredient of the substance employed and capable of liberating metal therefrom.

12. The process of reducing metal, which consists in exposing a substance containing metal and two or more non-metallic elements to electrolysis, while employing an electrode, containing a metal methid and decomposable thereby and capable of liberating metal therefrom.

13. The process of reducing metal, which consists in exposing a substance containing metal, oxygen, and a haloid, to electrolysis, while employing an electrode containing a metal methid decomposable thereby and capable of liberating metal therefrom.

14. The process of reducing metal, which consists in exposing a substance containing a metal and oxygen to electrolysis, while employing an electrode containing a metal methid decomposable thereby and capable of liberating metal therefrom.

15. The process of reducing metal, which consists in fusing a compound containing a metal and one or more electro-negative elements, and exposing it to the action of a metal methid, capable of liberating metal therefrom and an electric current.

16. The process of reducing metals, which consists in fusing a compound containing a metal and one or more electro-negative elements, and exposing it to the combined action of a methid capable of liberating metal therefrom and an electric current.

17. The process of reducing metal, which consists in exposing a compound of metal with one or more electro-negative elements, while in contact with a metal methid, decomposable thereby and capable of liberating metal therefrom to the action of an electric current.

18. The process of reducing aluminium, which consists in exposing a substance containing the same to the combined action of a methid electrode capable of liberating metal therefrom and an electric current.

19. The process of reducing aluminium, which consists in exposing a substance containing aluminium, oxygen and a haloid, to electrolysis, while employing an electrode containing a methid decomposable thereby.

In testimony whereof I have signed my name to this specification in the presence of two subscribing witnesses.

HENRY SPENCER BLACKMORE.

Witnesses:
C. C. WRIGHT,
H. N. JENKINS.